United States Patent [19]

Wyman

[11] Patent Number: 4,683,929
[45] Date of Patent: Aug. 4, 1987

[54] DEFLATION-PROOF PNEUMATIC TIRE WITH ELASTOMERIC FILLINGS

[76] Inventor: Ransome J. Wyman, 821 Camino Calibri, Calabasas, Calif. 91302

[21] Appl. No.: 771,383

[22] Filed: Aug. 29, 1985

Related U.S. Application Data

[63] Continuation of Ser. No. 505,042, Sep. 9, 1983, abandoned.

[51] Int. Cl.$^4$ .............................................. B60C 7/00
[52] U.S. Cl. ..................................... 152/313; 152/310
[58] Field of Search ............................... 152/310–313, 152/330 RF, 330 R; 528/85, 906; 523/166; 524/741, 779, 871; 428/912; 264/267

[56] References Cited

U.S. PATENT DOCUMENTS

| Re. 29,890 | 1/1979 | Gomberg | 152/310 |
|---|---|---|---|
| 2,650,212 | 8/1963 | Windemuth | 260/75 |
| 3,022,810 | 2/1962 | Lambe | 152/157 |
| 3,112,785 | 3/1963 | Altorfer | 152/313 |
| 3,236,815 | 2/1966 | Pigott | 152/330 R |
| 3,381,735 | 5/1968 | Tallott et al. | 152/313 |
| 3,390,119 | 6/1968 | Alexander | 260/33.6 |
| 3,505,275 | 7/1970 | Sato et al. | 524/779 |
| 3,605,848 | 9/1971 | Lombardi et al. | 152/310 |
| 3,866,652 | 2/1975 | Ahmad | 152/312 |
| 4,094,353 | 6/1978 | Ford | 152/310 |
| 4,125,660 | 11/1978 | White et al. | 152/310 |
| 4,125,691 | 11/1978 | White | 152/330 RF |
| 4,230,168 | 10/1980 | Kaneda et al. | 152/330 RF |

FOREIGN PATENT DOCUMENTS

| 3043913 | 4/1978 | Japan | 152/310 |
|---|---|---|---|
| 53-43913 | 4/1978 | Japan | . |
| 759540 | 10/1956 | United Kingdom | 152/310 |
| 1071374 | 6/1967 | United Kingdom | . |
| 1250266 | 10/1971 | United Kingdom | . |
| 1310728 | 3/1973 | United Kingdom | . |
| 1362674 | 8/1974 | United Kingdom | . |
| 1367086 | 9/1974 | United Kingdom | . |
| 1537039 | 12/1978 | United Kingdom | . |

OTHER PUBLICATIONS

Upjohn Polymer Chemicals, Technical Information Specification for Papi 901, P.C. No. 05 (Rev. 10/74).

Primary Examiner—Donald E. Czaja
Assistant Examiner—Ramon R. Hoch
Attorney, Agent, or Firm—Nilsson, Robbins, Dalgarn, Berliner, Carson & Wurst

[57] ABSTRACT

A deflation-proof penumatic tire comprises a casing and a substantially void-free, preferably oil-containing elastomeric filling material. The tire casing is injected with a combination comprising a polyol, an organic polyisocyanate and water, in amounts and under conditions sufficient to produce carbon dioxide and form a polyurea-containing polyurethane elastomer in which the carbon dioxide is dissolved in the elastomer, thereby providing a substantially void-free filling material. The formulation permits the addition of a substantial amount of extender oil while retaining an acceptable level of hardness.

14 Claims, 1 Drawing Figure

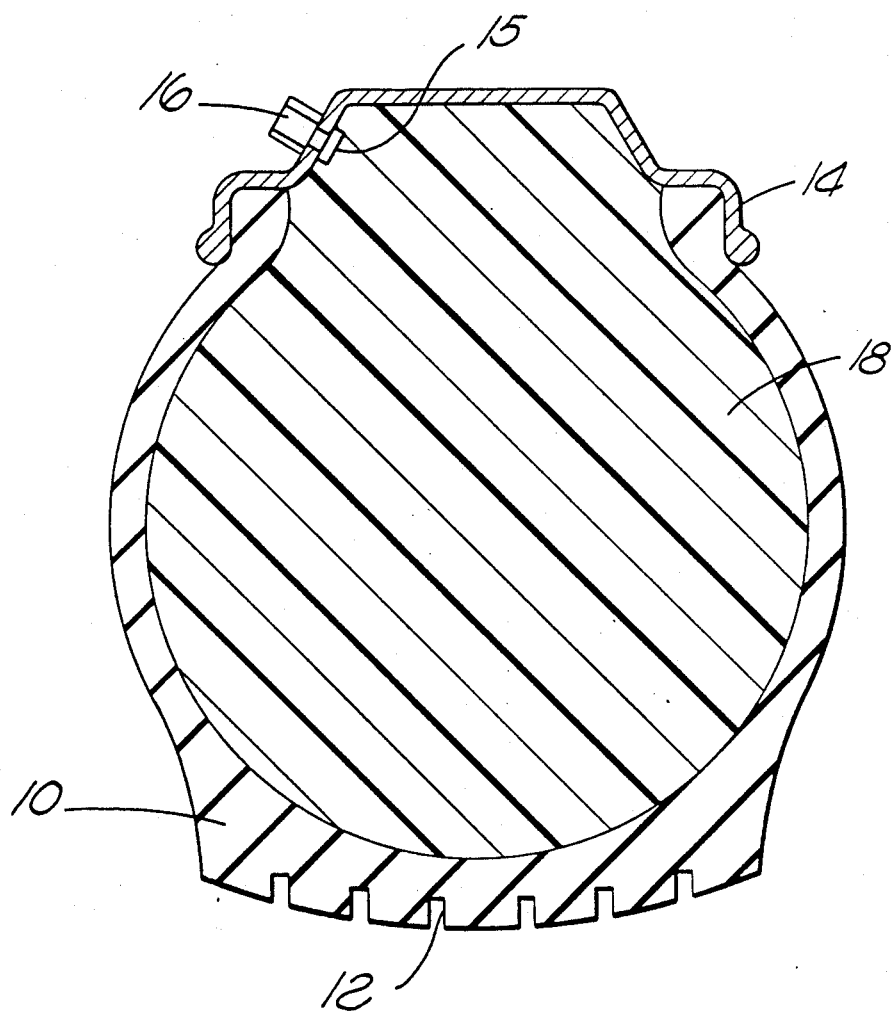

DEFLATION-PROOF PNEUMATIC TIRE WITH ELASTOMERIC FILLINGS

This is a continuation of application Ser. No. 505,042, filed Sept. 9, 1983, now abandoned.

FIELD OF THE INVENTION

The field of art to which the invention pertains includes the field of polymer-filled pneumatic tires.

BACKGROUND AND SUMMARY OF THE INVENTION

The pneumatic tire is unsurpassed in providing load support with maximum shock absorption, not only for automobiles, trucks, and aircraft but also for lift trucks, dock vehicles, military vehicles, municipal service equipment, and the like. This superior performance results from a combination of the properties of the reinforced rubber casing and gas at a proper pressure. Of course, a major drawback to the use of gas-filled pneumatic tires is the inconvenience and danger posed by puncturing of the tire. Tire failure, as in blow-outs, can result in human injury and equipment damage. A slow gas leak results in improper inflation leading to premature tire wear and increased rolling resistance. Particularly in an industrial environment where scrap material may be strewn along the floor or roadway, the use of gas-filled pneumatic tires must either be avoided or the contaminated area must be constantly swept clean.

A variety of solutions designed to prevent or mitigate the puncture of pneumatic tires have been proposed and used. Liners of various types have been provided in the tire or between an inner tube and the tire casing serving to mitigate the effects of penetration of the tire. Some heavy industrial pneumatic tires have been fitted with an impenetrable metal chain barrier. A more prevelant method for overcoming the problem is converting pneumatic tires to solid or semi-solid composite tires. Such tires have gained wide acceptance for certain mining, industrial and construction uses where the added weight, and somewhat inferior dynamic performance, could be tolerated for permanent protection from flat tires.

Until recently, such solid, deflation-proof tires have depended on the presence of a foamed elastomer filling. For example, Lambe U.S. Pat. No. 3,022,810 describes a pneumatic tire filled entirely with an intrinsically compressed resilient foam which is produced in situ, that is, directly within the tire, exemplified by a polyurethane foam in which carbon dioxide bubbles are evolved during reaction producing a rubber-like polymer foam within the casing. Altorfer U.S. Pat. No. 3,112,785 adds a conventional foaming agent to liquid polyurethane foaming material as it is pumped into a tire casing, with resultant in situ formation of a foamed polyurethane. Altorfer then injects a liquid antifreeze solution into the tire to be dispersed along with air into the cellular structure. Talcott et al U.S. Pat. No. 3,381,735 describes a deflation-proof vehicle tire in which synthetic rubber filler material is foamed in place and then vulcanized. Lombardi et al. U.S. Pat. No. 3,605,848 describes a tire having its casing filled with a microcellular, open cell urethane core. Water is described as serving as a blowing agent in the production of carbon dioxide upon reaction with the isocyanate component of the polyurethane precursor liquids. Again, when the precursor polymer material is injected into the tire casing, it results in the formation of a polymer foamed in situ.

Because the foam fillings in such tires are easily flexed, the tires have serious disadvantages related to excessive heat build-up within the tire and filler breakdown during service, decreasing casing support with the possibility of severe casing damage. Moreover, by generating gases in situ, volumes and pressures are undefinable and unpredictable. In order to obtain sufficient uniformity to achieve predetermined volume and pressure levels, "factory installation" is required with expensive and inordinate controls to assure uniformity from tire to tire. Because of the drawbacks to the foregoing utilization of foamed polymers as fillers, Gomberg in U.S. Pat. No. Re. 29,890 proposed a pneumatic tire in which the casing was filled with a void free elastomeric material. Specifically, the elastomeric material was produced in the essential absence of foam producing material in the reaction zone. Because it has less deflection than foam tires, superior heat build-up characteristics were obtained. Additionally, the elastic material was found to have a Durometer hardness in the range of about 25–43 on the A Scale. Generally, a Durometer hardness of at least 20, preferably about 30 on the A Scale is satisfactory. However, because the Gomberg elastomer entirely fills the tire casing without voids, a significant drawback is the resultant very high cost of filling a tire. Efforts to reduce that cost by diluting the filler material with extender oil can result in a sharp decrease in hardness.

The present invention proceeds by adding water as a reactant to produce carbon dioxide in the reaction zone but curing the elastomer under conditions whereby the carbon dioxide is dissolved in the elastomer to produce a substantially void-free elastomeric filling material. Generally, for most tires, those that stretch, a pressure of at least 25 psi is required to prevent bubble formation in the tire.

As a result of the water reaction, a polyurea-containing polyurethane elastomer is obtained having superior hardness characteristics. Oil can be added while maintaining a Durometer hardness of at least 20 on the A scale. While a polyurea-containing elastomer generally has less oil compatability on a weight basis than an all-urethane-containing elastomer, because of its very high Durometer hardness, it actually has higher oil compatability for a particular level of Durometer hardness. In other words, whereas urethane systems can be oil-extended at a useful hardness level, the level of oil extension is limited by large decreases in hardness. On the other hand, elastomer prepared in accordance with the present invention can be extended by as much as 50 weight percent with oil and still yield a Durometer hardness of 30; at lower hardness levels, up to 60 weight percent oil can be added without bleeding from the elastomer at room temperature.

It will be appreciated that the result is a large savings in cost in filling a tire. Additionally, because water is used as a reactant, one can operate without the stringent moisture-free conditions required in producing the Gomberg elastomer. Furthermore, one can incorporate other diluents which contain moisture which cannot be incorporated in the Gomberg tire because of the moisture content. For example, one can add substantial quantities, up to 50 weight percent, of rubber buffing dust, ground off the tires before retreading, thereby yielding additional cost savings.

In addition, the fill appears to resist heat build-up. It is hypothesized that because the fill contains $CO_2$ under pressure, as temperatures during use rise, e.g. to 200° F., the $CO_2$ content serves to increase pressure, decreasing deflection and increasing rebound, serving to limit heat build-up.

The urethane is prepared by reacting a polyol with an organic polyisocyanate and water, as described above. In a particular embodiment, the polyol is a triol having a molecular weight of at least 3,000; it has been found that higher molecular weight polymers are more compatible with higher oil levels. A particularly useful polyisocyanate is toluene diisocyanate. Another particularly useful polyisocyanate is polymethylene polyphenylisocyanate. In addition, one can incorporate a small amount, up to about 5 weight percent, of an inorganic absorbent for the carbon dioxide, such as calcium oxide or hydroxide, aluminum trihydrate, zinc oxide or the like.

BRIEF DESCRIPTION OF THE DRAWINGS

The FIGURE is a cross-sectional view of a conventional tire casing mounted on a vehicle wheel rim and filled in accordance with the present invention.

DETAILED DESCRIPTION

While the invention will be exemplified by reference to a specific polyurethane elastomeric polymer, the invention in general and certain aspects in particular are broad in scope, for example, the concept of curing an elastomer within a pneumatic tire casing to maintain carbon dioxide from the elastomer reaction dissolved in the elastomer. Consequently, specific details disclosed herein are merely representative and are deemed to afford the best embodiments known at this time to provide a basis for the claims which define the scope of the present invention. It is further to be understood that the invention is useful with any pneumatic tire, from bike-size to giant-size, whether the tire is of the "tubeless" variety or uses an inner tube.

As shown in the FIGURE, a conventional tire casing 10 having a road-engaging tread 12 thereon is mounted on a rim 14 of a vehicle wheel (not shown). The rim 14 has an opening 15 for a valve stem 16 through which the liquid polymer is pumped into the tire. In following the procedure of the present invention, the space confined by the rim 14 and casing 10 is filled with an elastomeric organic polymer material 18 forming a substantially void-free solid elastomer.

Methods for filling pneumatic tires with elastomeric filling material are well known; see for example, the detailed description given in the Gomberg U.S. Pat. No. Re. 29,890, the teaching thereof being incorporated herein by reference. The liquid filling material is introduced through the valve stem 16. A small hole is punctured through the tire opposite the valve stem opening to provide a gas escape outlet while the liquid filling material is being injected into the inside of the casing. As usual, the filling material reactants are provided in two separate containers, usually referred to as an "A-side" and "B-side", although in the present invention, the reactive materials other than water and the catalyst can be provided from one container. From the point of view of ease of measurement, the A-side and B-side are usually formulated so as to require approximately equal volume for appropriate reaction, as will be described in more detail hereinafter.

The mixed liquid is pumped into the tire. After partial filling, entrapped air is released by puncturing the tire. When all air is displaced by the liquid, the puncture is sealed with a flat head metal screw. Final liquid pressure must be about the same as used with air to firmly secure the tire casing to the rim and prevent slippage. When fully pressurized, the tire liquid supply inlet is sealed and the urethane is cured to full hardness before use.

Continuous processes for tire filling can be used, simultaneously proportioning, mixing, pumping and pressurizing the liquid components. Metering, pumping, and pressurizing in continuous equipment for tire filling is accomplished by coupling two identical double-ball pumps to a single air motor. The pumps cycle simultaneously and deliver identical volumes of the two liquid components. Mixing is accomplished with static mixers. Several types are available including Ross, Kennics and Komax. These mixers function in a similar fashion, i.e., they all blend liquids by dividing and recombining liquid streams.

The elastomer may be cured at room temperature for approximately one week or somewhat longer for full cure. Alternatively, the tire may be placed in an oven maintained at mild heating temperatures of 90° F., curing taking overnight. The tire may then be used for its intended purpose. As usual, with elastomeric tire filling materials, additional cure can take place for a period of up to two weeks, even during use.

Referring more particularly to the polymer forming materials, the precursors to a polyurethane elastomer are advantageously provided in two parts, an A-side and a B-side. The A-side comprises a portion of the polyol component and/or the organic polyisocyanate component. In addition, in a preferred embodiment where extender oil is used, a portion of the extender oil is provided on the A-side. The B-side contains the remaining amount of polyol, remaining amount of extender oil and water as a reactant as well as a catalyst for the isocyanate-water reaction. An antioxidant may be contained in either the A-side or B-side. Alternatively, all the components except the water and catalyst can be located on one side, in which case, streams coming from the two containers must be metered appropriately to provide the desired ratio of components. Another alternative is to provide all of the polyol and polyisocyanate components on one side, volumetrically balancing the other side with extender oil, so that the two streams are of equal volume. More generally, the components can be combined in any ratio to fit the convenient processing of any tire filling machine.

Any of the organic polyisocyanates used in the art to prepare polyurethanes and polyurea-containing polyurethanes can be used, for example, hexamethylene diisocyanate; m-xylylene diisocyanate; toluene diisocyanate; polymethylene polyphenylisocyanate; 4,4'-diphenylmethane diisocyanate; m-phenylene diisocyanate; p-phenylene diisocyanate; 3,3'-dimethyl-4,4'-diphenyl diisocyanate; methylenebis (2-methyl-p-phenylene) diisocyanate; 3,3'-dimethoxy-4,4'-biphenylene diisocyanate; 2,2', 4,4'-tetramethyl-4,4'-biphenylene diisocyanate; 3,3'-dimethyl-4,4'-diphenylmethane diisocyanate; 4,4'-diphenylisopropylidene diisocyanate; 1,5'-naphthylene diisocyanate; and polymethylene polyphenylisocyanate. One group of especially preferred polyisocyanates are the toluene diisocyanate isomers, particularly 2,4-toluene diisocyanate. The commercially available blends of the 2,4- and 2,6-isomers are effective—the 80:20 and 65:35 blends being most readily available. Another especially preferred polyisocyanate is polymethylene polyphenylisocyanate such as sold by the Upjohn Company under the trademark PAPI 901. This has an average molecular weight of 260–300, an isocyanate equivalent of 133, an NCO content of 31.6 weight percent, an acidity of 0.05% as HCl and a viscosity at 25° C. of 80 lps.

The poly can be chosen from a variety of OH terminated polyethers. Preferred are the polyoxyalkylene polyols having 2–4 hydroxyl groups and where the aklylene group has 2–6 carbon atoms. A large variety are available, obtained by polymerization of an aklylene oxide, such as ethylene oxide, propylene oxide, or butylene oxide, with a glycol. Polyethers having higher functionality may be obtained by reaction with a triol or higher polyol, such as glycerine, trimethylolpropane, and pentaerythritol. Polyols of the above types are available commercially, for example: Voranols (trademark) from Dow Chemical Company; Poly-G (trademark) from Olin Chemicals Division; and Pluracols (trademark) from BASF Wyandotte Corporation. In particular, a predominantly polypropylene-oxide triol having a molecular weight of at least 3,000 is most suitable.

A portion of the polyisocyanate, i.e. the polyisocyanate on the A-side, can be reacted with the polyol so as to form a prepolymer or quasi-prepolymer, in which essentially all the terminal groups are isocyanate groups. Because the reaction between water and the isocyanate group is desired, one would not ordinarily "block" the prepolymer terminal isocyanate group, as is commonly done and as is described in the Gomberg patent. On the other hand, the present method does not preclude blocking of a certain proportion of the polyisocyanate groups.

The catalyst is preferably one which facilitates the reaction between the isocyanate group and the water. Any of the well known catalysts used in the production of polyurethane foam can be used, such as the tertiary amine catalysts, or dibutyltin dilaurate or other organotin catalysts, for example, the high-performance organotin catalyst sold under the trade designation Formrez UL-22 by Whitco Chemical Company, New York, N.Y.

It is preferred to add at least 10 volume percent, up to about 60 volume percent, of an extender oil while retaining a Durometer hardness of at least 20 on the A scale. One can use any of the processing oils commonly used in industry to extend polymers that would be compatible with the urethane elastomer. Preferably, the extender oil is substantially aromatic and may contain polar compounds. A particularly effective oil is the aromatic extender oil sold under the trade mark Califlux LP or Bearflex LPO, both sold by the Whitco Chemical Company. Califlux LP comprises about 78 percent aromatics and 9 percent polar compounds, the remainder being saturates. It has a specific gravity at 6° F. of 0.9786, an API gravity of 13.1, a viscosity, SUS, at 100° F. of 169, a flash point COC of 320° F., and an aniline point of less than 59° F. The Bearflex LPO extender oil has about 77 percent aromatics, 3 percent polar compounds and 20 percent saturates. It has a specific gravity at 60° F. of 0.9679, an API gravity of 14.7, a viscosity SUS at 100° F. of 130, a flash point, COC of 310° F. and an aniline point of 59° F.

Generally the higher the amount of polar components and aromatic content of the extender oil, the better will be the compatibility in the polyurethane elastomer, since polyurethane elastomers have polar groups. Also, oil compatibility increases with increase in molecular weight of the polyol, assuming stoichiometry with the polyisocyanate. Accordingly, it will be advantageous to use higher molecular weight polyols. On the other hand, hardness as measured by Durometer hardness on the A-scale, decreases with increasing molecular weight. Accordingly, since both oil compatability and hardness is desired, one must balance one against the other. This balance is facilitated by the present invention which by providing a water reactant forms a polyurea-containing polyurethane, having a very high level of hardness. While the polyurea-containing polyurethane is somewhat less compatible with extender oil than is an all urethane containing elastomer, as will be illustrated in the examples to follow, the oil compatibility at any particular level of hardness is greater than with all urethane elastomers.

By curing the elastomer under conditions whereby the carbon dioxide is dissolved in the elastomer and remains dissolved, one obtains the resistance to deflection of the solid fill tire and thereby lowers heat build-up. These conditions are readily obtained simply by using only a modest amount of catalyst and by filling the tire in the usual manner as described above to the desired pressure, at least 25 psi, sealing the tire and curing. The reaction is sufficiently slow that an insubstantial amount of carbon dioxide is released; rather it remains dissolved within the polymer until the polymer fully sets where it is trapped in the dissolved state.

One can use any common antioxidant, such as butylated hydroxy toluene sold as Ionol by Shell Oil Company.

The following examples in which all parts are by volume, unless otherwise indicated further illustrate the invention.

EXAMPLE 1

The A-side of a liquid polyurethane precursor was prepared by mixing 32.8 parts of a 6000 molecular weight polypropylene-oxide triol with nine parts of toluene diisocyanate. The triol, terminated with primary hydroxyl, was a commercial formulation, from Carpenter Chemical Company. The toluene diisocyhanate was a commercial 80:20 blend of the 2,4- and 2,6- isomers, specifically, Mobay Mondur TD-80. In addition, the A-side contained 58.0 parts of Califlux LP extender oil.

The B-side of the liquid polyurethane precursor was a blend of triol, oil extender, water and catalyst. It was prepared by mixing: 56.2 parts of the 6000 molecular weight polypropyleneoxide triol, 43.0 parts of the Califlux LP, 0.57 parts of water, and 0.2 parts of the organotin catalyst Formrez UL-22.

The A- and B-sides were combined into a closed mold and mixed well together. The castings were cured at an isocyanate index of 105 and cured at 150° F. for 20 hours. The result was a void-free elastomer having a Durometer hardness of about 30 on the A Scale. The elastomer showed no bleeding of oil at room temperature.

EXAMPLES 2–7

A variety of formulations were prepared combining the 6000 molecular weight triol of Example 1, the toluene diisocyanate of Example 1, water and the Formrez UL-22 catalyst, in the amounts given in Table I. In each example, one sample of the elastomers was prepared without oil and the other samples with varying amounts of extender oil, up to 65 percent in some cases. The elastomers were tested for hardness and were observed for oil bleeding at room temperature (R.T Oil Bleed). The formulations and results are listed in Table I.

TABLE 1

| Composition of Blend | | Ex | Blend, % | Califlux LP, % | Hardness | R.T. Oil Bleed |
|---|---|---|---|---|---|---|
| 6000 Triol | 88.8% | 2a | 100 | 0 | 68 | No |
| T.D.I. | 10.5 | 2b | 60 | 40 | 41 | No |
| Water | 0.6 | 2c | 50 | 50 | 30 | No |
| UL-22 | 0.05 | 2d | 45 | 55 | 25 | No |
| | | 2e | 40 | 60 | 17 | No |
| | | 2f | 35 | 65 | 11 | Yes |
| 6000 Triol | 87.5% | 3a | 100 | 0 | 42 | No |
| T.D.I. | 10.3 | 3b | 60 | 40 | 25 | No |
| Ethylen Glycol | 2.1 | 3c | 50 | 50 | 8 | No |
| UL-22 | 0.05 | 3d | 45 | 55 | 3 | No |
| | | 3e | 40 | 60 | 0 | No |
| | | 3f | 35 | 65 | 0 | No |
| 6000 Triol | 95.6% | 4a | 100 | 0 | 20 | No |
| T.D.I. | 4.4 | 4b | 60 | 40 | 2 | No |
| UL-22 | 0.05 | 4c | 50 | 50 | 0 | No |
| | | 4d | 45 | 55 | 0 | No |
| | | 4e | 40 | 60 | 0 | No |
| | | 4f | 35 | 65 | 0 | No |
| 6000 Triol | 95.3% | 5a | 100 | 0 | 37 | No |
| T.D.I. | 4.5 | 5b | 60 | 40 | 12 | No |
| Co Cure 30 | 0.19 | 5c | 50 | 50 | 0 | No |
| | | 5d | 40 | 60 | 0 | No |
| | | 5e | 35 | 65 | 0 | No |
| 4800 Triol | 94.3% | 6a | 100 | 0 | 50 | No |
| T.D.I. | 5.5 | 6b | 80 | 20 | 37 | No |
| Co Cure 30 | 0.19 | 6c | 70 | 30 | 30 | No |
| | | 6d | 60 | 40 | 23 | No |
| | | 6e | 50 | 50 | 13 | No |
| | | 6f | 45 | 55 | 9 | Yes |
| | | 6g | 40 | 60 | 5 | Yes |
| 3000 Triol | 91.7% | 7a | 100 | 0 | 58 | No |
| T.D.I. | 8.2 | 7b | 80 | 20 | 50 | No |
| Co Cure 30 | 0.18 | 7c | 70 | 30 | 43 | No |
| | | 7d | 60 | 40 | 36 | No |
| | | 7e | 50 | 50 | 28 | Yes |
| | | 7f | 45 | 55 | 23 | Yes |

With regard to Example 2, it will be seen that up to 60 percent of the Califlux LP could be added without bleeding. Importantly, one could add up to 50 percent of the Califlux Lp and still retain a Durometer hardness of 30 on the A Scale, as indicated in Example 2C. In Example 3, by substituting ethylene glycol for water, greater compatibility with oil is obtained, but there is a very sharp unacceptable decrease in Durometer hardness.

In Example 4, with no water present, the addition of only 40 percent Califlux results in a drastic softening of the elastomer. In Example 5, a different catalyst was used, designed for the isocyanate hydroxyl reaction. This was an organomercurial urethane catalyst sold by Cosan Chemical Corporation under the trademark Co Cure 30, containing 60 percent active ingredient and 20 percent mercury calculated as metal. This catalyst is designed for the isocyanate hydroxyl rection. Again, one can see that there is a drastic reduction in hardness, although not as much as with the Formrez UL-22 catalyst. In Examples 6 and 7, triols of decreasing molecular weight, 4800 and 3000, respectively, were used. It is seen that the result is an increase in hardness of the elastomer but a decrease in the tolerance for the oil in that bleeding occurs at 55 and 50 percent, respectively. In Example 7, a Durometer hardness of 28 is obtained with 50 percent Califlux, but the elastomer bleeds at room temperature. In contrast, referring back to Example 2, by practice of the present invention, a Durometer hardness of 30 is obtained with 50 percent Califlux without bleeding.

EXAMPLES 8-10

In these Examples, elastomers were cast using varying amounts of water, and in one case the chain extender diethyleneglycol. The results obtained are shown in Table II.

TABLE II

| | Example 8 | Example 9 | Example 10 |
|---|---|---|---|
| Component | | | |
| 6000 Triol, % | 42.7 | 44.7 | 43.7 |
| T.D.I., % | 6.6 | 4.8 | 4.8 |
| Califlux LP, % | 50.0 | 50.0 | 50.0 |
| Antioxidant, % (butylated hydroxy toluene) | 0.1 | 0.1 | 0.1 |
| Water, % | 0.5 | 0.3 | 0.1 |
| Diethyleneglycol, % | — | — | 1.2 |
| UL-22, % | 0.1 | 0.1 | 0.1 |
| Properties | | | |
| Hardness | 52 | 29 | 10 |
| R.T. Oil Bleed | No | No | No |

It will be seen that compatibility with the extender oil is not greatly affected by the density of the urea groups, but that substituting diethyleneglycol for water results in a marked decrease in Durometer hardness.

EXAMPLE 11

The A-side of a liquid polyurethane precursor was prepared by mixing 16.2 parts of a 6000 molecular weight polypropylene-oxide triol with 12.6 parts of PAPI 901, a commercial polymethylene polyphenylisocyanate. In addition, the A-side contained 71.0 parts of Bearflex LPO extender oil and 0.2 part of Ionol antioxidant.

The B-side of the liquid polyurethane precursor was a blend of triol, oil extender, water and catalyst. It was prepared by mixing 69.5 parts of the 6000 molecular weight polypropyleneoxide triol, 30.0 parts of the Bearflex LPO, 0.5 part of water, and 0.005 part of the organotin catalyst Formrez UL-22.

The A- and B-sides can be combined into a closed mold, mixed well together and cured at 150° F. for 20 hours. The result is a void-free elastomer having excellent hardness, bleed and heat build-up characteristics.

In each of the foregoing formulations, one can incorporate a small amount of a scavanger for carbon dioxide, preferably a metal oxide or hydroxide, for example, calcium hydroxyde, aluminum trihydrate, magnesium oxide, zinc oxide or the like, generally in slight excess of the stoichiometric amount based on carbon dioxide generated. For example, one can add 1-5 weight percent of calcium hydroxide to the formulation of Example 1.

Also, because one uses water in the formulation, one can add moisture containing diluents, which is not feasible with certain other formulations, such as the Gomberg formulation. In this regard, during the processing of tires, a large quantity of rubber dust is created which contains a small amount of moisture but which can be added as a diluent to the present formulations in an amount up to 50 weight percent or even more. For example, one can add 25 weight percent of rubber dust to the formulation of Example 1.

What is claimed is:

1. A flat-free tire comprising a tire casing and a substantially void-free polyurea-containing polyurethane elastomer filling material having a Durometer hardness of at least 20A and confined, at least in part, by said casing, said filling material including at least 10 volume percent extender oil and being the product of a reaction of a polyol, and organic polyisocyanate and water, in amounts and under conditions sufficient to produce carbon dioxide dissolved in said elastomeric filling material.

2. The tire of claim 1 in which said conditions comprise filling said tire casing prior to significant production of carbon dioxide, to a tire pressure of at least 25 p.s.i. and wherein the carbon dioxide is produced in a quantity which is effective to increase the pressure within the tire casing as the temperature of the filling material increases during use.

3. The tire of claim 1 or 2 in which a major portion of said oil is aromatic and said oil contains a significant amount of polar compound.

4. The tire of claim 3 in which said polyol is a triol having a molecular weight of at least 3000.

5. The tire of claim 4 in which said polyisocyanate is toluene diisocyanate.

6. The tire of claim 5 in which said polyisocyanate is polyethylene polyphenylisocyanate.

7. The tire of claim 1 in which said filling material additionally comprises an inorganic absorbent for said carbon dioxide.

8. The tire of claim 7 in which said absorbent is calcium oxide or calcium hydroxide.

9. The tire of claim 1 in which said filling material additionally contains at least 5 weight percent powdered rubber.

10. A flat-free tire, comprising a tire casing and a substantially void-free polyurea-containing, oil-containing polyurethane elastomeric filling material and confined, at least in part, by said casing, said filling material being the product of the reaction within the tire casing, under a hydraulic pressure of at least 25 p.s.i., of a triol having a molecular weight of at least 3000, an organic polyisocyanate and greater than 0.1 volume percent water in the presence of at least 10 volume percent of extender oil, in amounts and under conditions sufficient to produce carbon dioxide dissolved in said filling material.

11. The tire of claim 10 in which said filler material additionally comprises at least 5 weight percent of powdered rubber.

12. The tire of claim 10 or 11 in which said filler material additionally comprises an inorganic absorbent for said carbon dioxide.

13. The tire of claim 12 in which said absorbent is calcium oxide or calcium hydroxide.

14. A flat-free tire, comprising a tire casing and a substantially void-free polyurea-containing polyurethane elastomeric filling material having an ultimate Durometer hardness of at least 20A and confined, at least in part, by said casing, said filling material being the product of the reaction within the tire casing, under a hydraulic pressure of at least 25 p.s.i., of a polyol, an organic polyisocyanate and greater than 0.1 volume percent water added as a reactant, in the presence of at least 10 volume percent extender oil, in amounts and under conditions sufficient to produce carbon dioxide dissolved in said filling material in a quantity which is effective to increase the pressure within the tire casing as the temperature of the filling material increases during use.

* * * * *